US012755047B2

(12) United States Patent
Navon et al.

(10) Patent No.: US 12,755,047 B2
(45) Date of Patent: Oct. 6, 2026

(54) STORAGE DEVICE WITH HYBRID ENCRYPTION LEVELS

(71) Applicant: Sandisk Technologies, Inc., Milpitas, CA (US)

(72) Inventors: Ariel Navon, Revava (IL); Shay Benisty, Beer Sheva (IL)

(73) Assignee: Sandisk Technologies, Inc., Milpitas, CA (US)

( * ) Notice: Subject to any disclaimer, the term of this patent is extended or adjusted under 35 U.S.C. 154(b) by 228 days.

(21) Appl. No.: 18/617,335

(22) Filed: Mar. 26, 2024

(65) Prior Publication Data

US 2025/0307448 A1 Oct. 2, 2025

(51) Int. Cl.
*G06F 21/62* (2013.01)

(52) U.S. Cl.
CPC ................................ *G06F 21/6227* (2013.01)

(58) Field of Classification Search
CPC .................................................. G06F 21/6227
See application file for complete search history.

(56) References Cited

U.S. PATENT DOCUMENTS 10,528,556 B1 1/2020 Chmil et al.
10,642,828 B2 5/2020 Tabak et al.
10,936,757 B2 3/2021 Ito et al.
10,997,301 B1 5/2021 Rivlin
11,244,072 B2 2/2022 Barday et al.
11,361,099 B2 6/2022 Lahav et al.
11,429,736 B2 8/2022 Gupta et al.
11,977,657 B1 * 5/2024 Calafato ............. G06F 21/6227
2009/0300351 A1 * 12/2009 Lei ........................ H04L 9/0894
707/999.005
2016/0191544 A1 * 6/2016 Kim ...................... H04L 63/061
713/171
2021/0184840 A1 * 6/2021 Yeo ......................... H04L 63/06
2022/0121781 A1 * 4/2022 Klapman .............. G06F 3/0604
2023/0359369 A1 * 11/2023 Muthiah ............... G06F 3/0655
2024/0275592 A1 * 8/2024 Kavirayani ........... H04L 9/0894

FOREIGN PATENT DOCUMENTS

EP 3264314 B1 2/2021
GB 2581188 A 8/2020
WO WO-2017055261 A1 * 4/2017 ........... H04L 9/3242

* cited by examiner

*Primary Examiner* — Hee K Song
(74) *Attorney, Agent, or Firm* — Patterson + Sheridan, LLP

(57) ABSTRACT

Data security is challenging. Oftentimes it is desired to be able to encrypt the data, yet still search the data efficiently. One manner of achieving the goal is to store the data and keyword metadata separately. The data and keyword metadata can even be encrypted differently where the data has a stricter encryption compared to the keyword metadata. Furthermore, if a security threat is detected, the encryption type can be changed to a more restrictive encryption. Once the security threat has passed, the encryption can be changed to a less restrictive encryption.

17 Claims, 6 Drawing Sheets

STORAGE DEVICE WITH HYBRID ENCRYPTION LEVELS

BACKGROUND OF THE DISCLOSURE

Field of the Disclosure

Embodiments of the present disclosure generally relate to encryption within data storage devices.

Description of the Related Art

Encryption of data is a standard security family of operations that are commonly used to protect data from being stolen, changed or damaged, by applying reversible transformation on the data that produces a garbage like outcome so as to prevent unauthorized read/access to the data. There are operating systems (OS) that use encryption of data as a standard or as an optional operation.

Two types of encryption are particularly interesting: encrypted search and deterministic encryption. Encrypted search may be defined as the ability to search over encrypted documents to find the encrypted data desired. More specifically, encrypted search is a way to protect data that has been indexed for search. Neither the search service, the admins, nor hackers with access to the service can extract information about what is stored or about incoming searches without expending an extreme amount of effort. Everything is meaningless without the right key(s).

Encrypted Search is a deeply studied area of cryptography with thousands of papers, approaches, and attacks. The approaches range from deterministic encryption where a word is always encrypted to the same value to more random approaches. Some of the approaches hide how many results link to a specific token.

The basic core idea of encrypted search is using deterministic encryption, where a particular word always encrypts to a specific value. The allocation of certain words to specific values might utilize indexing and hashing, and the transverse operation of decryption of the encrypted data is done in that case by applying relevant set of keys values. These keys allow using the deterministic nature of the encrypted data for executing fast and simple search operation over the encrypted stored data.

There is an advantage to using deterministic encryption. Conventional search operations over encrypted data require the following preliminary stages: (1) physical reading of data; (2) data decoding; (3) transfer of whole data to the host device; and (4) decryption of data (principally could also be done at the storage device before transfer). Since executing such "heavy" operations on large volume of data are every expensive (i.e., time, power, performance), it dramatically limits profitability of such data search operations.

However, a deterministic encryption might allow executing search operations directly on the encrypted data, which might allow content searching directly on the data placed at the storage device saving the transfer and decryption operations, and sometimes, in low-bit error rate (BER) cases, also saves the decoding. There is a drawback to deterministic encryption, and that is "leakage". As the encrypted data is less random in such cases, these deterministic encryption methods are more vulnerable to security attack risk (e.g., by applying frequency analysis attacks that might use solving cryptogram using information about the most used characters etc.).

These security drawbacks are usually referred to as "leakage". Leakage is where an attacker with access to the data store or with visibility into the flow of encrypted queries and results can learn things about the data, such as which searches are most popular or which words show up most often in the data. Learnings like this are called "leakage" and they may allow an attacker to at least partially reverse an index.

Therefore, there is a need in the art for improved data encryption.

SUMMARY OF THE DISCLOSURE

Data security is challenging. Oftentimes it is desired to be able to encrypt the data, yet still search the data efficiently. One manner of achieving the goal is to store the data and keyword metadata separately. The data and keyword metadata can even be encrypted differently where the data has a stricter encryption compared to the keyword metadata. Furthermore, if a security threat is detected, the encryption type can be changed to a more restrictive encryption. Once the security threat has passed, the encryption can be changed to a less restrictive encryption.

In one embodiment, a data storage device, comprises: a memory device; and a controller coupled to the memory device, wherein the controller is configured to: place data in a first physical location of the memory device; place keyword metadata of the data in a second physical location of the memory device, wherein the first physical location and the second physical location are distinct and different; encrypt the data; and encrypt the keyword metadata, wherein the encryption for the data is different from the encryption for the keyword metadata.

In another embodiment, a data storage device comprises: a memory device; and a controller coupled to the memory device, wherein the controller is configured to: search encrypted keyword metadata, wherein the keyword metadata is disposed in a first partition of the memory device; determine that the encrypted keyword metadata has relevant keywords; decrypt logical block addresses (LBAs) corresponding to the relevant keywords; and search the decrypted LBAs.

In another embodiment, a data storage device comprises: means to store data; and a controller coupled to the means to store data, wherein the controller is configured to: detect whether a security risk to data stored in the means to store data is present; and change a type of encryption for the data based upon the detecting.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Data security is challenging. Oftentimes it is desired to be able to encrypt the data, yet still search the data efficiently. One manner of achieving the goal is to store the data and keyword metadata separately. The data and keyword metadata can even be encrypted differently where the data has a stricter encryption compared to the keyword metadata. Furthermore, if a security threat is detected, the encryption type can be changed to a more restrictive encryption. Once the security threat has passed, the encryption can be changed to a less restrictive encryption.

Figure 1:
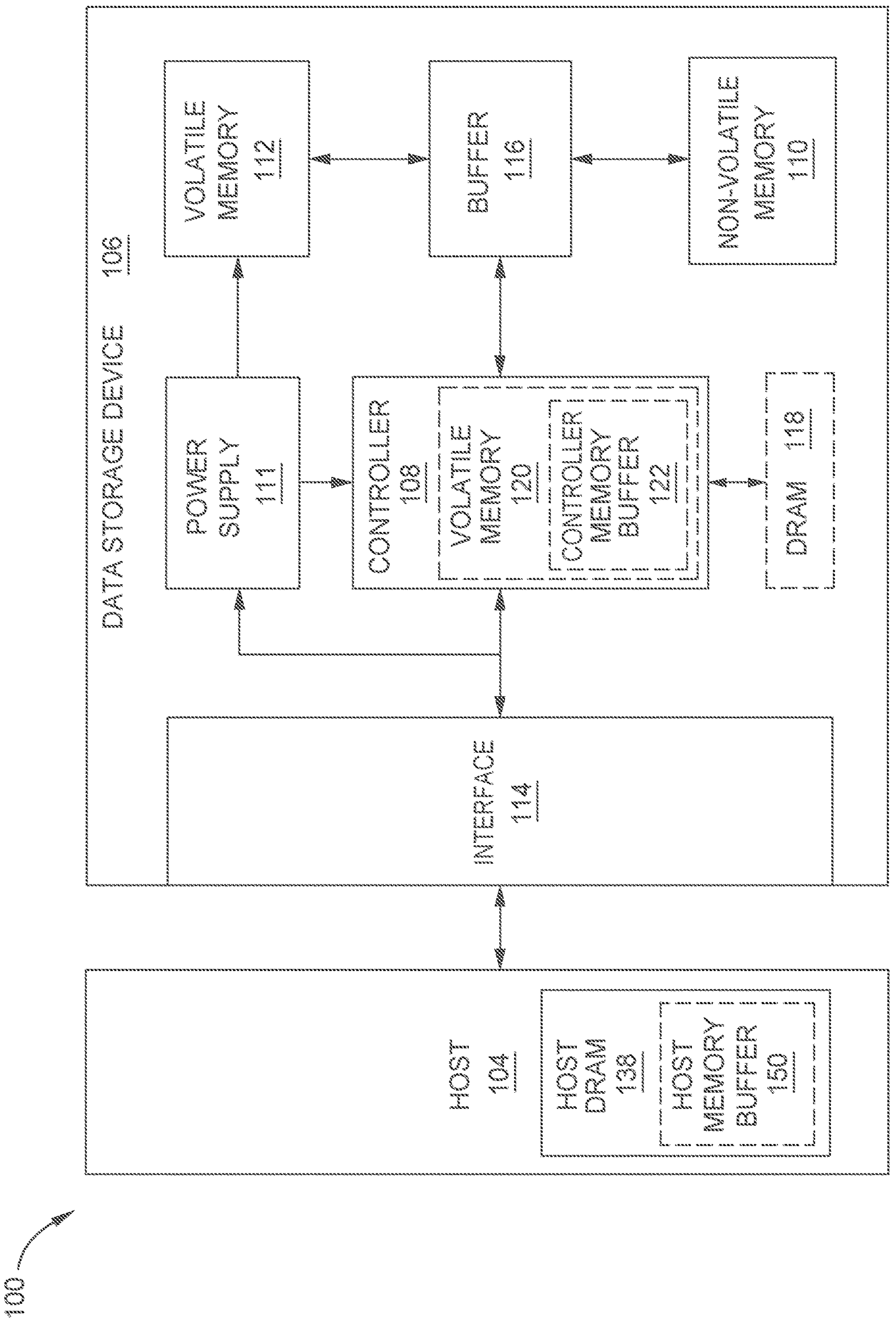
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110. Controller 108 may include circuitry or processors configured to execute programs for operating the data storage device 106.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

In terms of data encryption, it would be ideal to have a foot in both worlds and earn the dramatic advantages of enabling encrypted data search directly on the data placed at the storage device, saving the need to decode, decrypt and transfer the data, while still mitigating the related security risks associated with deterministic encryption.

As discussed herein, the disclosure involves a hybrid data encryption method that will allow, on the one hand, applying search operations directly on the encrypted data stored at the storage device, saving transfer and decryption for each search, and on the other hand allow the higher security level of standard non-deterministic data encryption whenever indication for security threat occurs. The basic idea is to regularly hold the data in deterministic encryption on the storage device that allows encrypted search; and convert the data to non-deterministic encryption according to identification of security threat indication. The other way of viseversa conversion back to deterministic encryption is initiated given a sign of low security risks.

Figure 2:
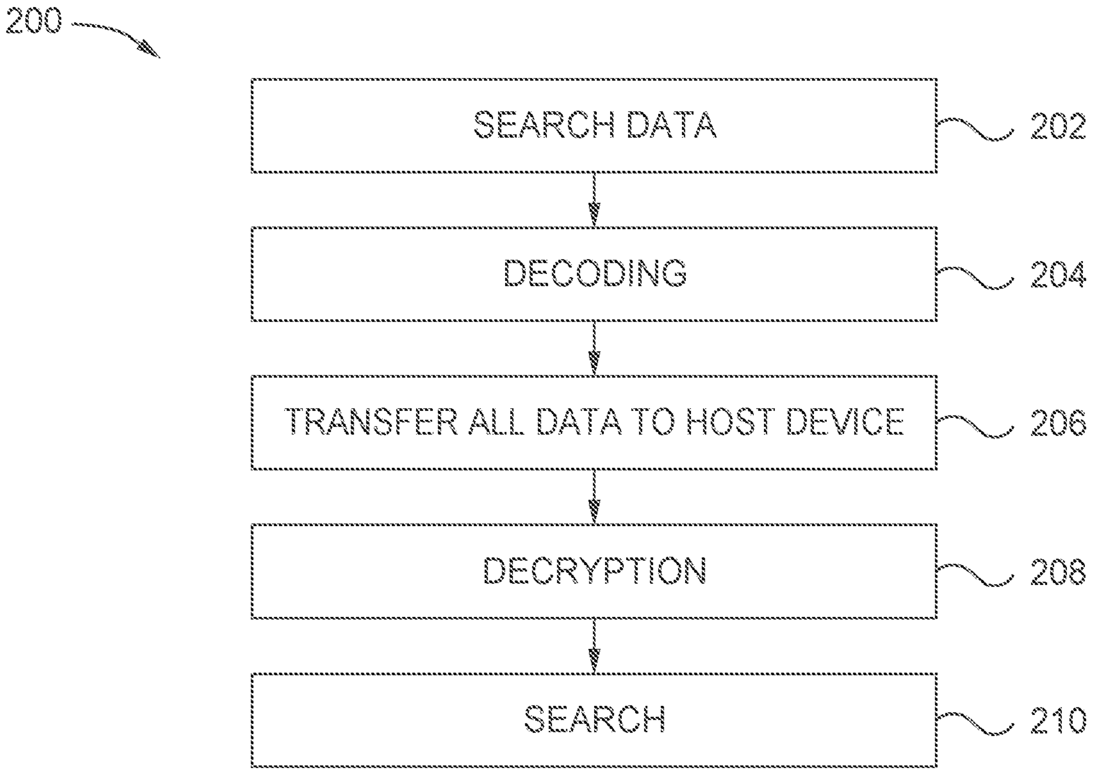
FIG. 2 is a flowchart illustrating searching standard encrypted data.
Figure 3:
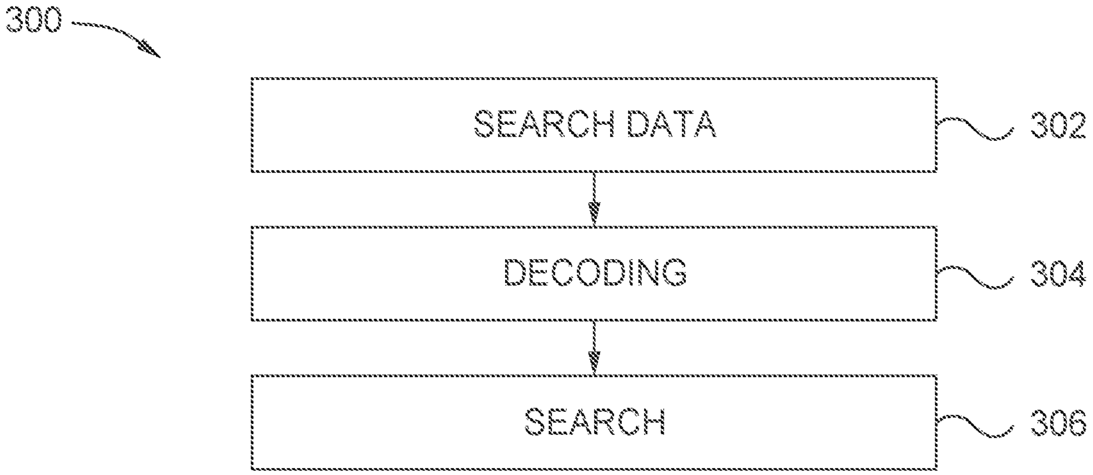
FIG. 3 is a flowchart illustrating searching deterministic encrypted data.

FIGS. 2 and 3 offer a comparison of the different procedures involved with executing search operations on data which is encrypted in standard (i.e., non-deterministic encryption) vs. encrypted search (i.e., done on deterministic encrypted data). In particular, FIG. 2 is a flowchart illustrating searching standard encrypted data, and FIG. 3 is a flowchart illustrating searching deterministic encrypted data. In either FIG. 2 or FIG. 3, the search command comes from either a host device or internally from the controller.

In regards to FIG. 2, the flowchart 200 illustrates a method that begins at block 202 where a command is received to search data. The data is decoded at block 204 followed by transferring all of the now decoded data to the host device (or whomever issued the search command) at block 206. Decryption of the data occurs next at block 208 followed by searching the decrypted data at block 210 to find the desired results. The decryption can be done internally at the controller, and, in one embodiment, the decryption occurs prior to the transfer at block 206.

In regards to FIG. 3, the flowchart 300 illustrates a method that begins at block 302 where a command is received to search data. Thereafter, the data is decoded at block 304 followed by searching the data at block 306 for results of the search command.

Figure 4:
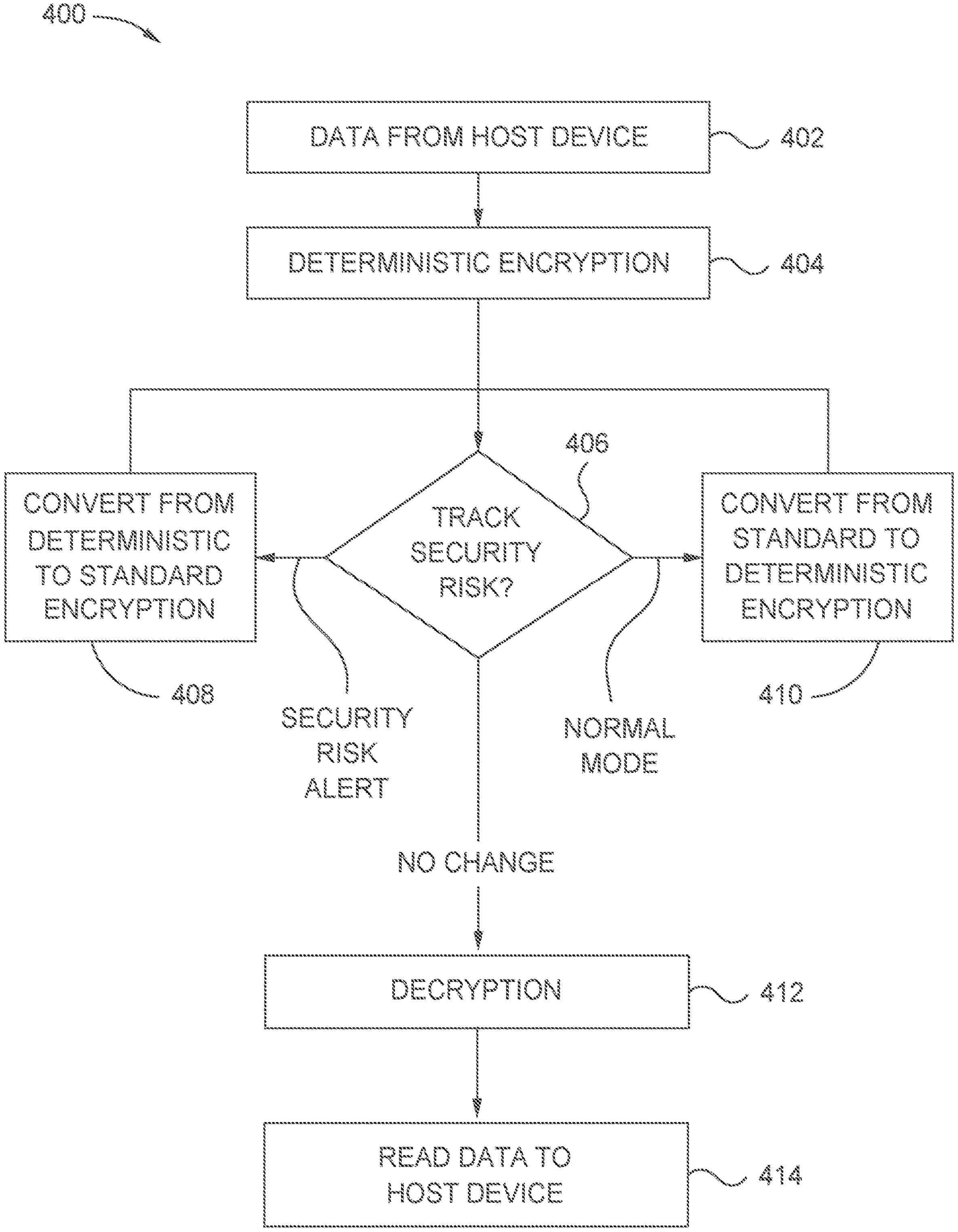
FIG. 4 is a flowchart illustrating dynamic encryption.

The basic idea of exchanging/converting encryption according to security risk triggering is illustrated in FIG. 4. In FIG. 4, the data is regularly held in deterministic encryption format that allows much a faster encrypted search procedure, while allowing a higher protection level due to dynamic conversion to non-deterministic encryption based on security risk indication. More specifically, FIG. 4 is a flowchart 400 illustrating dynamic encryption. Initially, data is received from a host device at block 402, and then the data is deterministically encrypted at block 404. The deterministic encryption can be done at either the host device or internally in the data storage device controller. At block 406, a security risk is tracked. If there is a security risk, then the data is converted from deterministic encryption to standard encryption at block 408. However, if there is no change in security risk (or the security risk has reduced), then if the data is in standard encryption, then the data can be switched to deterministic encryption at block 410. Regardless, the data can be decrypted at block 412 for sending the data to the host device 414 in response to a search command.

The method of FIG. 4, stated another way, involves deterministically encrypting the data at block 404. Thereafter, the security risks are tracked. If there is a security risk, then the data that is in deterministic encryption should be converted to standard encryption. If there is a security risk and the data is already in standard encryption, then there is no need to change the data security. If there is no security risk and the data is already in deterministic encryption, then there is no need to change the data security. If there is no security risk but the data is in standard encryption, the security can be changed to deterministic encryption. Regardless of the level of encryption, the data will be decrypted at block 412 before being provided to a host device (or whomever provided a search command).

The conversion to non-deterministic encryption can be prioritized to be done according to the importance/sensitivity measure of the different data regions on the storage device, or even be done always only on limited such memory partitions. There are several options to initiating such an encryption conversion: (1) explicit indication from the host device; (2) internal indication from machine learning (ML)/estimation model when the model outputs exceed a pre-defined threshold; and (3) internal indication from an outlier detection model without need for thresholds.

The trigger/indication to a higher level of current/expected security risk can either be provided by the host device or be deduced internally by the storage device by an estimation/prediction model that will track several features values and will alert once the risk for a security violation exceed a predefined threshold (e.g., by training a supervised fraud model). That is to say that data will be collected in advance of a large amount of normal behavior of the system, without security risk events, as well security events logs. These security events can be real events or artificially initiated security attacks. Training can occur off-line using a supervised ML model that can predict expected high risk events. The relevant features can be, for example, number and frequency of read/program commands, size of commands, portions of different command types, power consumption patterns, frequency of access to different address ranges, etc.

Another option avoids the need of using predefined parameters, such as a threshold, by applying outlier detection models. Such models can either be based on in advance knowledge of "normal" behavior based on pre-collected data, or else be dynamically updated according to later storage device usage patterns in a way that capture the current behavior of the user. For instance, assume a specific application uses only random traffic. The detection of a massive sequential traffic may be considered as a hint for a possible security issue. In one embodiment, after confirming a false alarm, the device may switch back to the deterministic encryption mode.

Switching between encryptions, while beneficial, may add meaningful overhead to the system, as well as hurting the power consumption and performance. Additionally, the dynamic switching relies on accurate and reliable identification and prediction of approaching security threats, whereas in real life it might be a challenging to achieve "bullet-proof" fraud identification models.

It is desired to have a method that will allow earning the fast search property of encrypted search, while preserving the high security levels of standard encryption; without the major overhead of switching between encryption formats during device lifetime. Rather than dynamically switching between deterministic encryption and standard encryption, separating the data for encryption purposes would be beneficial.

As discussed herein, extracting keywords from the content of each LBA placed at LBA metadata and concentrate these metadata of many LBAs in special meta-data physical partitions. These keywords metadata will be encrypted in a deterministic encryption that allows a fast encrypted search directly on the encrypted data without the need to execute preliminary decryption of data. The data itself, without the keywords metadata, will be encrypted in a conventional manner (i.e., non-deterministic encryption) that provides the higher level of security of a non-deterministic encryption. A search operation will be done first in a fast manner directly on the encrypted keyword metadata, and only in case of a match, the relevant LBAs data will be examined in a conventional manner. Doing so allows having the higher level of security of the data, encrypted in a non-deterministic manner, as well as a fast encrypted search, done on the keyword metadata, which is encrypted in deterministic manner. The core idea of separating the keyword metadata to a different partition, and encrypting in different formats within the different partitions is illustrated in FIG. 5.

Figure 5:
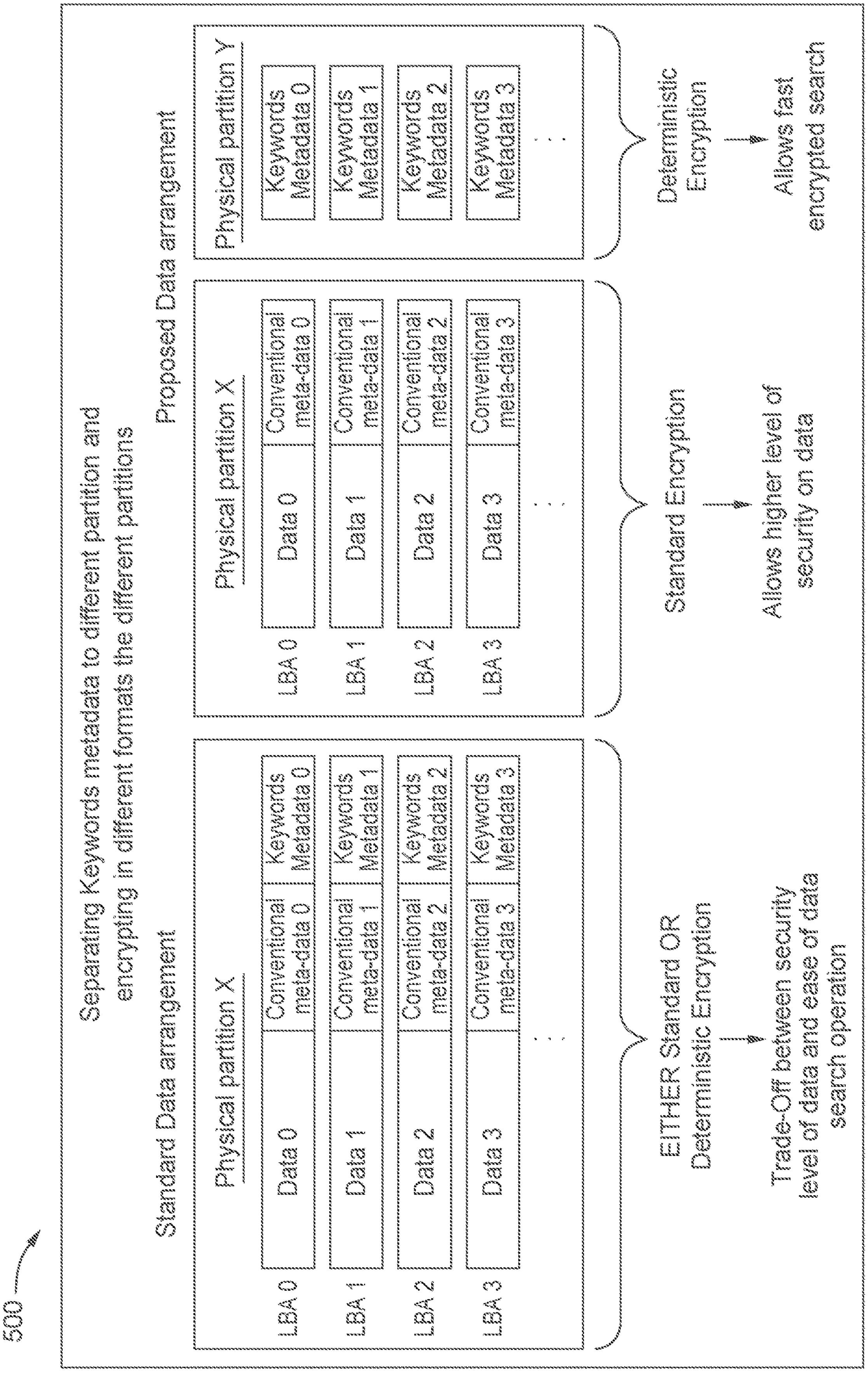
FIG. 5 is a schematic illustration of different partitioning in encryption according to one embodiment.

FIG. 5 is a schematic illustration 500 of different partitioning in encryption according to one embodiment. As shown in FIG. 5, the standard data arrangement involves keeping the data and keyword metadata together in the same storage location and encrypting the data and keyword metadata together using the same encryption type (i.e., standard or deterministic) which has a tradeoff between security levels of data and ease of data search operations. Such an arrangement is shown on the left hand side of FIG. 5.

The right side of FIG. 5, however, shows an embodiment where the keyword metadata and the data itself are in different data locations with different encryptions. More specifically, the right hand side shows separating the keyword metadata to different partition relative to the data and then encrypting the data and the keyword metadata in different encryption formats for the different partitions. The data, which has data of LBAs, is encrypted with standard (i.e., non-deterministic) encryption which allows for the higher level of security of the data. The keyword metadata, on the other hand, is encrypted with deterministic encryption with allows for a fast encrypted search. The data and the keyword metadata are disposed in separate and distinct locations such as different partitions of a memory device.

Figure 6:
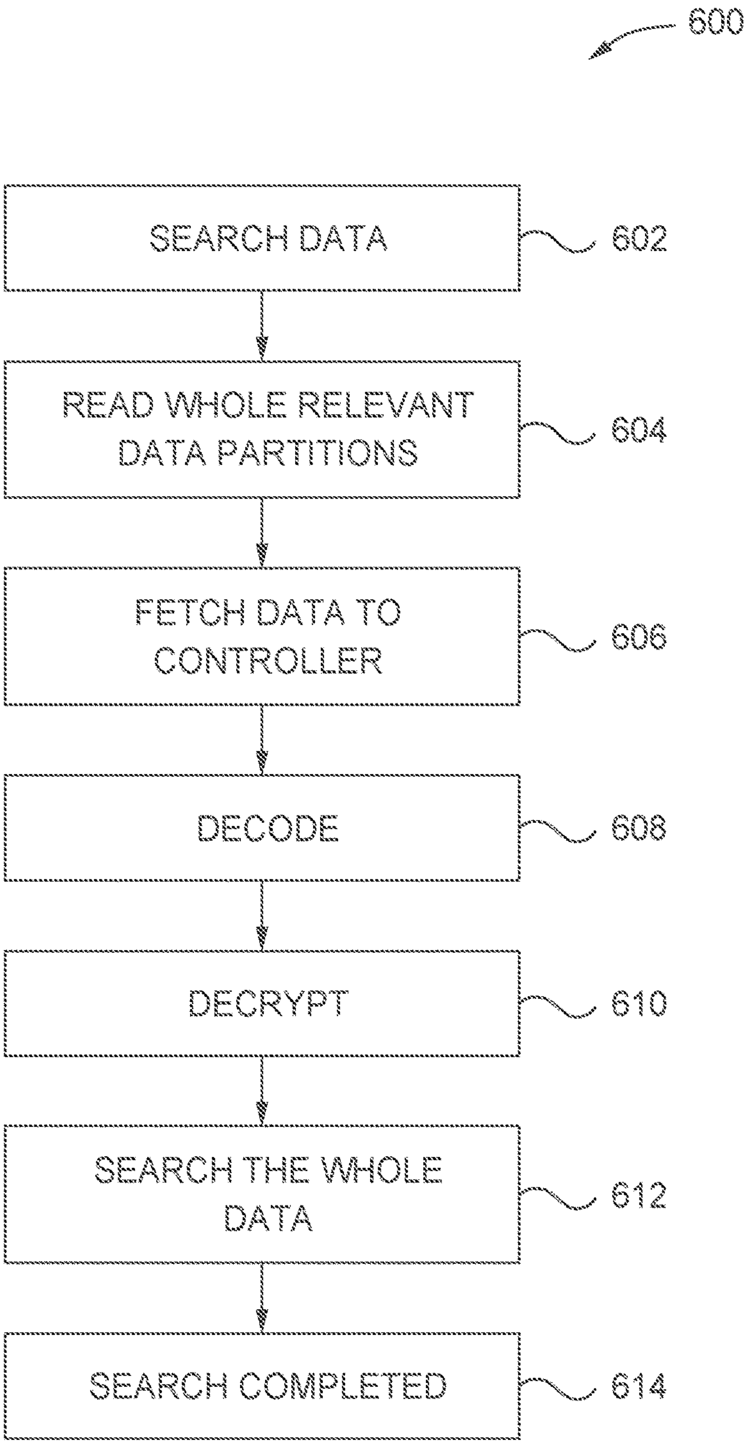
FIG. 6 is flowchart illustrating a search operation done on standard encrypted data.

FIG. 6 is flowchart 600 illustrating a search operation done on standard encrypted data. The operation begins by receiving a command to search data at block 602. The search command may come from either the host device or internally from the data storage device controller. Thereafter, the whole relevant data portions are read at block 604 and the data is then fetched to the controller at block 606. The data is then decoded at block 608 followed by decrypting the data at block 610. The data is then searched at block 612, and the search is completed at block 614. Note that in FIG. 6, the whole relevant data partition is fetched to the controller.

Figure 7:
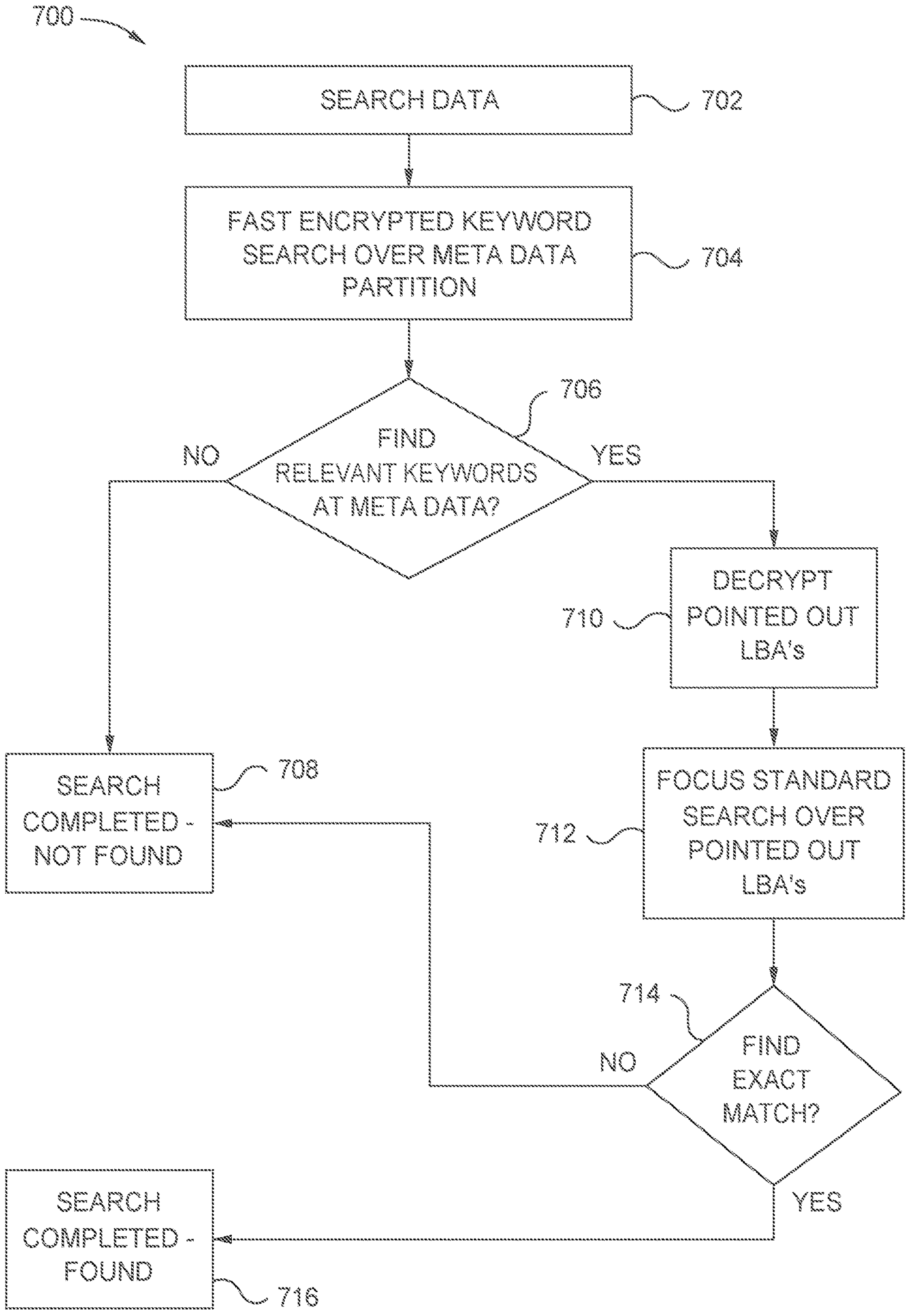
FIG. 7 is a flowchart illustrating a search operation done on both keyword metadata and standard encrypted data.

The proposed fast search operation flow, enabled by the separated metadata arrangement, is illustrated in FIG. 7. FIG. 7 is a flowchart 700 illustrating a search operation done on both keyword metadata and standard encrypted data. As shown in FIG. 7, initially, a search command is received to search for data at block 702. The search command may come from a host device or internally from the data storage device controller. A fast encrypted keyword search is performed over the metadata partition at block 704. If there is no match at block 706, then the search is completed at block 708 because nothing was found. If there is a match at block 706, then the LBAs pertaining to the resulting match are decrypted at block 710 followed by searching the decrypted LBAs at block 712. If there is a match at block 714, then the search is completed and the relevant data is found at block 716. However, if there is no match at block 714, then the search is completed at block 708 with nothing found.

There are several options to execute the encrypted search on the keywords metadata partition. It should be noted that all options mentioned below save the need to decrypt and even fetch the whole data before the search operation. Moreover, the search operation is preferably done internally at the controller of the storage device thus saving the need to transfer the metadata to the host device. The encrypted search options are as follows: (1) a first option includes an initial stage of decoding of the read data followed by the search; (2) another option is in case of low-BER and uncritical search operation, at which the encrypted search operation is executed directly on the encrypted (un-decoded) data with the assumption that bit-flip events are rare enough as to allow un-frequent search missing; (3) a last option also executes the search directly on the un-decoded meta-data, but a search operation is operated which is tuned to handle with partial match such that the search can overcome a small number of bit-flips in the searched pattern and the data itself. Further embodiments might include also placing the cached metadata at media that will allow faster and a more reliable fetching such as DRAM of NAND-SLC partitions.

In one embodiment, a data storage device, comprises: a memory device; and a controller coupled to the memory device, wherein the controller is configured to: place data in a first physical location of the memory device; place keyword metadata of the data in a second physical location of the memory device, wherein the first physical location and the second physical location are distinct and different; encrypt the data; and encrypt the keyword metadata, wherein the encryption for the data is different from the encryption for the keyword metadata. The encryption for the keyword metadata is deterministic encryption. The encryption for the data provides a higher level of security than the encryption for the keyword metadata. The encrypted keyword metadata is searchable without decrypting the keyword metadata. The first physical location is partitioned from the second physical location. The controller is configured to: receive a search command; and search the encrypted keyword metadata. The controller is configured to determine that there is one or more relevant keywords in the encrypted keyword metadata. The controller is configured to decrypt a portion of the encrypted data. The portion is encrypted data corresponding to the one or more relevant keywords. The controller is configured to search the portion for an exact match corresponding to the search command.

In another embodiment, a data storage device comprises: a memory device; and a controller coupled to the memory device, wherein the controller is configured to: search encrypted keyword metadata, wherein the keyword metadata is disposed in a first partition of the memory device; determine that the encrypted keyword metadata has relevant keywords; decrypt logical block addresses (LBAs) corresponding to the relevant keywords; and search the decrypted LBAs. The LBAs are disposed in a second partition of the memory device that is partitioned from the first partition. The searching of encrypted keyword metadata is in response to a search command received internally from the data storage device. The encrypted keyword metadata and the LBAs are encrypted differently. The controller is configured to track security risks to data. The controller is configured to change encryption for the encrypted keyword metadata from deterministic encryption to a different encryption. The encrypted keyword metadata is disposed in cache and the LBAs are disposed in the memory device.

In another embodiment, a data storage device comprises: means to store data; and a controller coupled to the means to store data, wherein the controller is configured to: detect whether a security risk to data stored in the means to store data is present; and change a type of encryption for the data based upon the detecting. The controller is configured to changing the type of encryption to deterministic based upon determining that there is no security risk. The data comprises a first portion of data comprising logical block addresses (LBAs) and a second portion of data that comprises keyword metadata for the LBAs, and wherein the first portion and the second portion are disposed in separate locations within the means to store data.

The embodiments discussed herein allow a much faster search operation on the stored data, thus saving the need in the large volume database decryption and transfer to host for applying the search, while preserving the higher security level of standard encryption. Hence, the embodiments herein eliminate the "Leakage" problem of deterministic encryption.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:

a memory device; and a controller coupled to the memory device, wherein the controller is configured to:

place data in a first physical location of the memory device;

place keyword metadata of the data in a second physical location of the memory device, wherein the first physical location and the second physical location are distinct and different;

encrypt the data with deterministic encryption;

encrypt the keyword metadata, wherein the encryption for the data is different from the encryption for the keyword metadata;

determine that there is a security risk for the data;

in response to the determining that there is a security risk, convert the data encrypted with deterministic encryption to data encrypted with non-deterministic encryption; and change the type of encryption back to deterministic based upon determining that there is no security risk for the data, wherein the encryption for the data provides a higher level of security than the encryption for the keyword metadata.

2. The data storage device of claim 1, wherein the encrypted keyword metadata is searchable without decrypting the keyword metadata.

3. The data storage device of claim 1, wherein the first physical location is partitioned from the second physical location.

4. The data storage device of claim 1, wherein the controller is configured to:

receive a search command; and search the encrypted keyword metadata.

5. The data storage device of claim 4, wherein the controller is configured to determine that there is one or more relevant keywords in the encrypted keyword metadata.

6. The data storage device of claim 5, wherein the controller is configured to decrypt a portion of the encrypted data.

7. The data storage device of claim 6, wherein the portion is encrypted data corresponding to the one or more relevant keywords.

8. The data storage device of claim 7, wherein the controller is configured to search the portion for an exact match corresponding to the search command.

9. The data storage device of claim 1, wherein the controller is configured to:

search encrypted keyword metadata, wherein the keyword metadata is disposed in a first partition of the memory device;

determine that the encrypted keyword metadata has relevant keywords;

decrypt logical block addresses (LBAs) corresponding to the relevant keywords; and search the decrypted LBAs.

10. The data storage device of claim 9, wherein the LBAs are disposed in a second partition of the memory device that is partitioned from the first partition.

11. The data storage device of claim 9, wherein the searching of encrypted keyword metadata is in response to a search command received internally from the data storage device.

12. The data storage device of claim 9, wherein the encrypted keyword metadata and the LBAs are encrypted differently.

13. The data storage device of claim 9, wherein the controller is configured to track security risks to data.

14. The data storage device of claim 9, wherein the controller is configured to change encryption for the encrypted keyword metadata from deterministic encryption to a different encryption.

15. The data storage device of claim 9, wherein the encrypted keyword metadata is disposed in cache and the LBAs are disposed in the memory device.

16. A data storage device, comprising:

means to store data; and a controller coupled to the means to store data, wherein the controller is configured to:

detect whether a security risk to data stored in the means to store data is present, wherein the data stored in the means to store data is encrypted with deterministic encryption;

change the encryption for the data from deterministic encryption to non-deterministic encryption based upon the detecting; and change the type of encryption back to deterministic based upon determining that there is no security risk, wherein the encryption for the data provides a higher level of security than encryption for metadata.

17. The data storage device of claim 16, wherein the data comprises a first portion of data comprising logical block addresses (LBAs) and a second portion of data that comprises keyword metadata for the LBAs, and wherein the first portion and the second portion are disposed in separate locations within the means to store data.

* * * * *